United States Patent
Wilde et al.

(10) Patent No.: US 7,393,304 B2
(45) Date of Patent: Jul. 1, 2008

(54) SHIFTER WITH GEAR POSITION INDICATOR

(75) Inventors: Scott D. Wilde, Grand Haven, MI (US); Robert A. DeJonge, West Olive, MI (US)

(73) Assignee: Grand Haven Stamped Products, Grand Haven, MI (US)

( * ) Notice: Subject to any disclaimer, the term of this patent is extended or adjusted under 35 U.S.C. 154(b) by 811 days.

(21) Appl. No.: 10/799,111

(22) Filed: Mar. 12, 2004

(65) Prior Publication Data

US 2004/0229726 A1    Nov. 18, 2004

Related U.S. Application Data

(60) Provisional application No. 60/511,421, filed on Oct. 13, 2003, provisional application No. 60/470,609, filed on May 15, 2003.

(51) Int. Cl.
    *B60K 20/00*    (2006.01)
    *G05G 5/00*    (2006.01)
    *G05G 5/08*    (2006.01)
    *F16H 59/04*    (2006.01)
    *B60W 10/00*    (2006.01)

(52) U.S. Cl. ............. 477/94; 74/473.21; 74/473.24; 74/473.3

(58) Field of Classification Search ........... 74/473.1, 74/473.3, 473.24, 473.21; 477/94
See application file for complete search history.

(56) References Cited

U.S. PATENT DOCUMENTS

| | | | |
|---|---|---|---|
| 2,925,061 A | 2/1960 | Thornburgh et al. | |
| 3,824,948 A * | 7/1974 | Faloon | 116/28.1 |
| 3,896,759 A | 7/1975 | Ogura | |
| 3,929,092 A | 12/1975 | Ogura | |
| 4,137,864 A | 2/1979 | Lauper | |
| 4,446,809 A | 5/1984 | Dennis | |
| 4,566,399 A | 1/1986 | Hildebrand et al. | |
| 4,580,518 A | 4/1986 | Scanlon et al. | |
| 4,798,160 A | 1/1989 | Mochida et al. | |
| 4,846,322 A * | 7/1989 | Swank | 192/219.4 |
| 4,964,359 A | 10/1990 | Richmond | |
| 4,980,803 A | 12/1990 | Richmond et al. | |
| 4,987,792 A | 1/1991 | Mueller et al. | |
| 4,991,535 A | 2/1991 | Kobayashi et al. | |
| 5,070,740 A | 12/1991 | Glek et al. | |
| 5,150,633 A | 9/1992 | Hillgärtner | |
| 5,159,892 A | 11/1992 | Hara et al. | |
| 5,199,376 A | 4/1993 | Pasco | |
| 5,357,820 A | 10/1994 | Moroto et al. | |
| 5,415,056 A | 5/1995 | Tabata et al. | |

(Continued)

FOREIGN PATENT DOCUMENTS

JP      6137425      5/1994

*Primary Examiner*—Tisha D Lewis
(74) *Attorney, Agent, or Firm*—Price, Heneveld, Cooper, DeWitt & Litton LLP

(57) ABSTRACT

A shifter for controlling a vehicle transmission includes a base and a shift lever movably mounted to the base for movement between a plurality of gear positions. At least one of the gear positions comprises a PARK/NEUTRAL position having a PARK and a NEUTRAL control feature. The shifter includes an input device configured to switch between PARK and NEUTRAL upon actuation of the input device by an operator. An indicator on the shift lever indicates if the transmission is in PARK or NEUTRAL.

33 Claims, 5 Drawing Sheets

U.S. PATENT DOCUMENTS

| | | | |
|---|---|---|---|
| 5,485,291 A | 1/1996 | Qiao et al. | |
| 5,532,908 A | 7/1996 | Yokoyama et al. | |
| 5,540,180 A | 7/1996 | Kataumi et al. | |
| 5,582,073 A | 12/1996 | Takeuchi et al. | |
| 5,622,079 A | 4/1997 | Woeste et al. | |
| 5,626,093 A | 5/1997 | Jacobs et al. | |
| 5,680,307 A | 10/1997 | Issa et al. | |
| 5,689,996 A | 11/1997 | Ersoy | |
| 5,768,944 A | 6/1998 | Inuzuka et al. | |
| 5,775,791 A | 7/1998 | Yoshikawa et al. | |
| 5,791,197 A | 8/1998 | Rempinski et al. | |
| 5,845,535 A | 12/1998 | Wakabayashi et al. | |
| 5,853,348 A * | 12/1998 | Lehman | 477/96 |
| 5,861,803 A | 1/1999 | Issa | |
| 5,887,694 A * | 3/1999 | Kruger | 192/220 |
| 5,899,115 A | 5/1999 | Kataumi et al. | |
| 5,913,935 A | 6/1999 | Anderson et al. | |
| 5,927,150 A | 7/1999 | Hirano et al. | |
| 5,934,145 A | 8/1999 | Ersoy et al. | |
| 6,082,286 A | 7/2000 | Kovach et al. | |
| 6,089,118 A | 7/2000 | Ishii et al. | |
| 6,098,483 A | 8/2000 | Syamoto et al. | |
| 6,125,714 A | 10/2000 | Woeste et al. | |
| 6,148,686 A | 11/2000 | Kataumi | |
| 6,151,977 A | 11/2000 | Menig et al. | |
| 6,192,770 B1 | 2/2001 | Miyoshi et al. | |
| 6,196,080 B1 | 3/2001 | Lee | |
| 6,209,408 B1 | 4/2001 | DeJonge et al. | |
| 6,209,410 B1 | 4/2001 | Suzuki | |
| 6,223,112 B1 | 4/2001 | Nishino | |
| 6,230,579 B1 | 5/2001 | Reasoner et al. | |
| 6,237,435 B1 | 5/2001 | Grönhage et al. | |
| 6,260,432 B1 | 7/2001 | Ehrmaier et al. | |
| 6,311,577 B1 | 11/2001 | Wörner et al. | |
| 6,325,196 B1 | 12/2001 | Beattie et al. | |
| 6,382,046 B1 | 5/2002 | Wang | |
| 6,401,564 B1 | 6/2002 | Lee | |
| 6,405,611 B1 | 6/2002 | DeJonge et al. | |
| 6,408,709 B2 | 6/2002 | Kim | |
| 6,422,106 B1 | 7/2002 | Lee | |
| 6,431,339 B1 | 8/2002 | Beattie et al. | |
| 6,439,073 B2 | 8/2002 | Ohashi et al. | |
| 6,443,024 B1 | 9/2002 | Skogward | |
| 6,474,186 B1 | 11/2002 | Vollmar | |
| 6,530,293 B1 | 3/2003 | Rückert et al. | |
| 6,536,299 B2 | 3/2003 | Kim | |
| 6,550,351 B1 | 4/2003 | O'Reilly et al. | |
| 6,553,858 B1 | 4/2003 | Kim | |
| 6,568,294 B2 * | 5/2003 | Jezewski | 74/473.18 |
| 6,612,194 B2 | 9/2003 | DeJonge | |
| 6,644,142 B2 | 11/2003 | Junge et al. | |
| 6,658,952 B2 | 12/2003 | Hayashi et al. | |
| 6,658,961 B2 * | 12/2003 | Lee | 74/473.3 |
| 6,732,847 B1 | 5/2004 | Wang | |
| 6,761,081 B2 | 7/2004 | Kliemannel | |
| 6,761,084 B2 | 7/2004 | Suzuki et al. | |
| 6,773,369 B2 | 8/2004 | Altenkirch et al. | |
| 6,783,480 B2 | 8/2004 | Masuda et al. | |
| 6,848,331 B2 | 2/2005 | Syamoto | |
| 6,848,332 B2 | 2/2005 | Hayashi et al. | |
| 6,857,335 B2 | 2/2005 | Kahara | |
| 6,865,967 B2 | 3/2005 | Shioji et al. | |
| 6,938,509 B2 * | 9/2005 | Bulgrien | 74/335 |
| 2003/0172757 A1 | 9/2003 | Yone | |
| 2003/0172762 A1 | 9/2003 | Ehrmaier et al. | |
| 2003/0188594 A1 | 10/2003 | Levin et al. | |
| 2003/0213327 A1 | 11/2003 | Syamoto | |
| 2004/0000210 A1 | 1/2004 | Cho | |
| 2004/0035237 A1 | 2/2004 | Matsui et al. | |
| 2004/0045392 A1 | 3/2004 | Wakayama | |
| 2004/0162185 A1 | 8/2004 | Giefer et al. | |
| 2004/0168537 A1 | 9/2004 | Koontz | |
| 2004/0194567 A1 | 10/2004 | Giefer et al. | |
| 2004/0216546 A1 | 11/2004 | Shiomi et al. | |
| 2004/0216547 A1 | 11/2004 | Shiomi et al. | |
| 2004/0216549 A1 | 11/2004 | Shiomi et al. | |
| 2004/0237692 A1 | 12/2004 | Syamoto et al. | |
| 2004/0237693 A1 | 12/2004 | Koide | |
| 2005/0028633 A1 | 2/2005 | Giefer et al. | |

* cited by examiner

SHIFTER WITH GEAR POSITION INDICATOR

CROSS-REFERENCE TO RELATED APPLICATIONS

The present application claims the benefit of U.S. Provisional Application No. 60/470,609, filed May 15, 2003, and also claims the benefit of U.S. Provisional Application No. 60/511,421, filed Oct. 13, 2003, the entire contents of each of which are incorporated by reference.

BACKGROUND OF THE INVENTION

Various shifters for controlling automatic transmissions in motor vehicles have been developed. Such shifters may include a shift lever with a knob having a button thereon connected with mechanical linkage to control the gear position of the automatic transmission. Such shift knobs and levers are often relatively large due to the need to house the mechanical linkage. Also, the overall shape and aesthetics of the shift lever and knob may be limited due to the need to house the mechanical linkage.

SUMMARY OF THE INVENTION

One aspect of the present invention is a shifter for controlling a vehicle transmission. The shifter includes a base and a shift lever movably mounted to the base for movement between a plurality of gear positions. At least one of the gear positions comprises a PARK/NEUTRAL position having a PARK and a NEUTRAL control feature. The shifter includes an input device configured to switch between PARK and NEUTRAL upon actuation of the input device by an operator. An indicator on the shift lever indicates if the transmission is in PARK or NEUTRAL.

Another aspect of the present invention is a shifter for vehicle transmissions including a base and a shift member movably mounted to the base for movement between DRIVE, PARK/NEUTRAL, and REVERSE gear positions. The shifter also includes a pawl selectively restricting movement of the shift member between the gear positions. A first input device on the shift member can be manipulated by an operator to control actuation of the pawl. The shifter also includes a second input device on the shift member to control shifting between PARK and NEUTRAL when the shift member is in the PARK/NEUTRAL gear position.

Yet another aspect of the present invention is a shifter for controlling the transmission of a vehicle. The shifter includes a floor console having a base, and a shift lever movably mounted to the base. The shift lever is movable between DRIVE, PARK/NEUTRAL, and REVERSE gear positions. The shift lever has a knob with an indicator on the knob providing an indication of the gear position of the transmission.

These and other features, advantages, and objects of the present invention will be further understood and appreciated by those skilled in the art by reference to the following specification, claims, and appended drawings.

DETAILED DESCRIPTION OF PREFERRED EMBODIMENT

Figure 1:
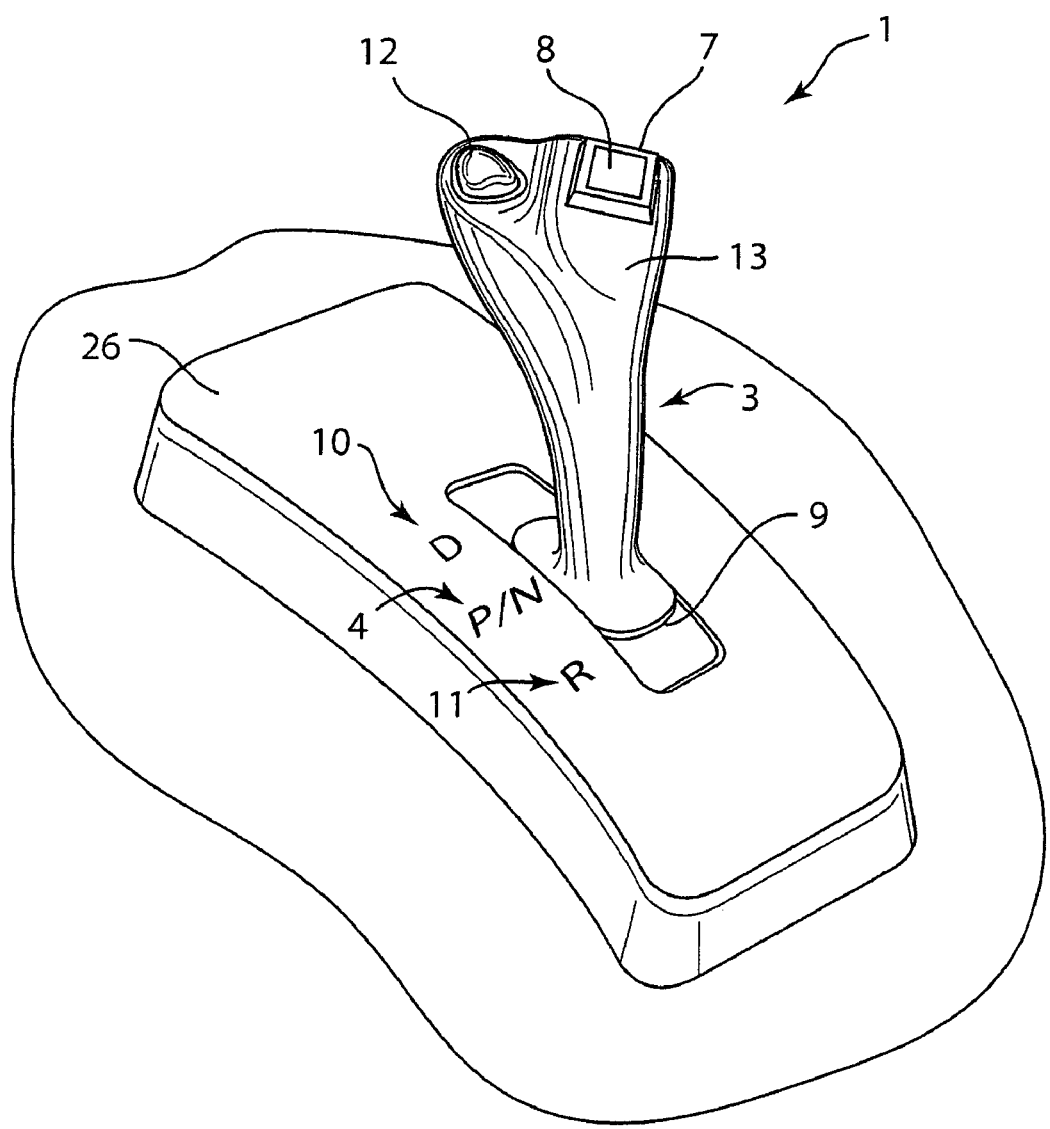
FIG. 1 is a perspective view of a shifter according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present application is related to U.S. application Ser. No. 10/762,837 (unofficial), entitled SOLENOID WITH NOISE REDUCTION, filed on Jan. 22, 2004, the entire contents of which are incorporated by reference.

Figure 2:
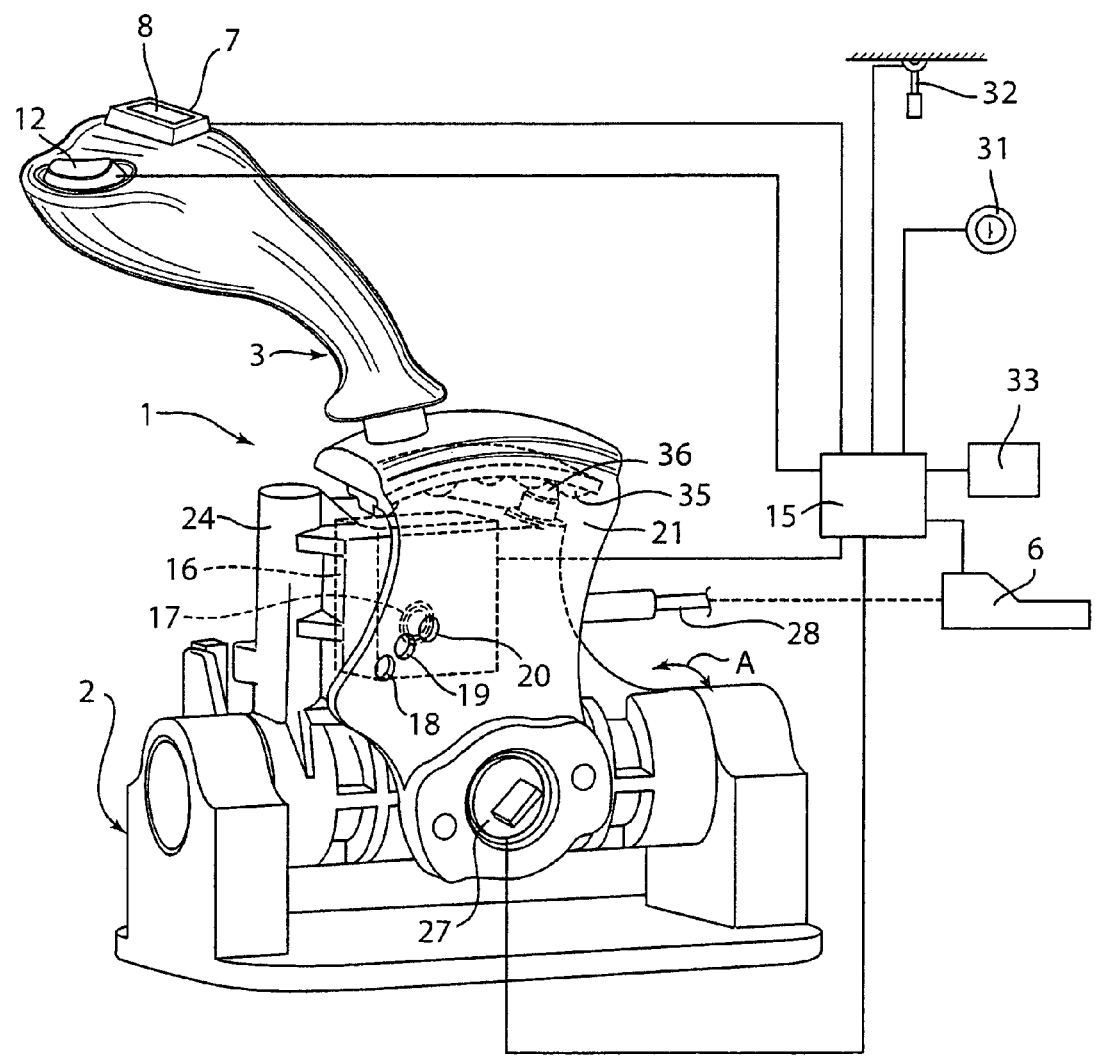
FIG. 2 is a partially schematic view of the shifter of FIG. 1.
Figure 3:
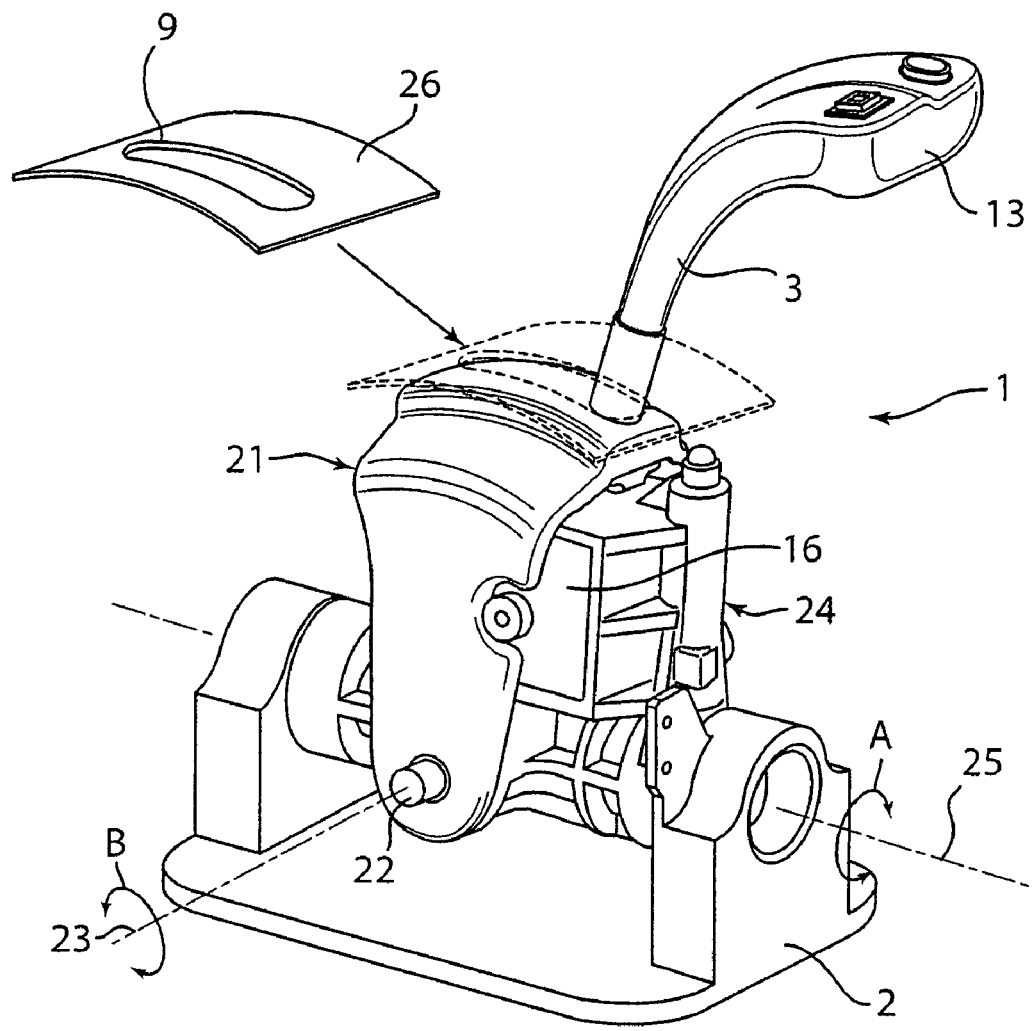
FIG. 3 is a perspective view of the shifter of FIG. 2.

With reference to FIGS. 1-3, a shifter 1 according to one aspect of the present invention includes a base 2 and a shift lever 3 that is movably mounted to the base for movement between a plurality of gear positions. At least one of the gear positions is a PARK/NEUTRAL gear position for having both a PARK and a NEUTRAL control feature. An input device such as a button 7 is configured to switch ("toggle") between PARK and NEUTRAL upon actuation of the button 7 by an operator. An indicator such as a lighted readout 8 on the shift lever 3 indicates if the transmission is in PARK or NEUTRAL. The gear position indicator 8 can be integrated into the PARK/NEUTRAL select control as shown, or it may be a separate device.

Conventional automatic transmissions are typically controlled by an electronic control unit (ECU). The ECU continuously monitors a series of input signals which can include road speed, throttle position, engine speed, and gear lever position. Through a complex series of algorithms the ECU processes the input signals to determine the current driving condition and the appropriate gear state for the transmission. This gear control occurs through the electrohydraulic unit, or valve body, within the transmission. The electrohydraulic unit consists of electrically operated solenoids and a series of mechanical valves which direct automatic transmission fluid (ATF) to different circuits in the transmission, thus activating the mechanical systems (gears, clutches, etc.) A major circuit within this system is NEUTRAL/PARK. In general, the same circuit is active in both PARK & NEUTRAL. The PARK state is distinguished from the NEUTRAL state by the fact that the output shaft is mechanically locked in the PARK state.

The shifter of the present invention utilizes a single gear position having both PARK and NEUTRAL control features, and an input device such as the toggle button 7 may be used to switch between the PARK and NEUTRAL states for the automatic transmission. Thus, shift lane 9 may include a DRIVE gear position 10, PARK/NEUTRAL gear position 4, and REVERSE gear position 11, thereby reducing the number of gear positions required in the shift lane. Because the shift lever 3 is in the same position for both PARK and NEUTRAL, readout 8 lets the operator know what state the transmission is in by displaying a signal such as "P" or "Park"

when the transmission is in the PARK state, and will display a lighted readout such as "N" or "Neutral" when the transmission is in the NEUTRAL state. The readout 8 may be an LCD, LED, or other suitable display.

Shift knob 13 may also include a pawl control button 12 that actuates a pawl to permit movement of the shift lever 3 between the DRIVE position 10, PARK/NEUTRAL position 4, and REVERSE position 11. As illustrated in FIG. 2, the toggle button 7 and pawl control button 12 may be operably coupled to a controller 15. The controller 15 is operably coupled to a powered actuator such as an electric solenoid 16 having a pawl or pin 17 that engages openings 18, 19 and 20 in a saddle member 21 to selectively lock the shift lever 3 in the DRIVE position 10, PARK/NEUTRAL position 4, or REVERSE position 11, respectively. The pin 17 may be biased into engagement with the openings 18, 19 and 20, such that electrical actuation of the solenoid 16 causes the pin 17 to retract from the openings 18, 19 or 20. Alternately, the solenoid 16 could be biased out of engagement, such that the solenoid 16 must be energized to engage the openings 18, 19 and 20. In the illustrated example, opening 18 corresponds to the DRIVE position 10, the opening 19 corresponds to the PARK/NEUTRAL position 4, and the opening 20 corresponds to the REVERSE position 11.

As illustrated in FIG. 3, saddle member 21 is pivotably mounted to a structural member 24 via bosses 22 for rotation about a transverse axis 23 as indicated by the arrow "B". A button 36 on structural member 24 is biased into engagement with a detent member 35 ("rooster comb") to thereby provide a detent for the rotational position of the shift lever 3. Also, in the illustrated example, the structural member 24 is rotatably mounted to the base 2 for rotation about an axis 25 as indicated by the arrow "A". However, in use, the shift lever 3 is restricted by the cover plate 26, such that it cannot rotate about the axis 25. It will be readily understood that the base 2 and structural member 24 could be formed as a single unit, such that side-to-side rotation about the axis 25 could be eliminated. Numerous other structural arrangements could be provided for movably mounting shift lever 3 to base 2. In the illustrated example, the saddle member 21, structural member 24, and base 2 are configured to provide rotation about both axis 23 and axis 25 to provide a "universal" arrangement that can be readily adapted to provide for a wide range of shift lane configurations by utilizing a cover plate 26 having the desired shift lane configuration.

In the illustrated example, an angular position sensor 27 (FIG. 2) detects the rotational position of the shift lever 3 and saddle member 21 about transverse axis 23. The angular position sensor 27 is operably coupled to the controller 15, such that the controller 15 has input concerning the position (DRIVE 10, PARK/NEUTRAL 4, or REVERSE 11) of the shift lever 3. The controller 15 is operably coupled to the transmission 6 to thereby control shifting of the transmission 6. Alternately, a conventional mechanical cable 28 may be connected to the saddle member 21, and thereby control the transmission 6 via the mechanical cable 28.

In operation, when first starting the vehicle, a user activates the vehicle ignition system by inserting a key or through the use of a keyless system, and depresses brake pedal 32. The operator then depresses the button 17 to shift the transmission 6 from PARK to NEUTRAL. The controller 15 is configured to prevent shifting from PARK to NEUTRAL unless the brake pedal 32 is depressed. Also, because the pin 17 of the pawl is engaged in opening 19, the operator cannot move the shift lever 3 from the PARK/NEUTRAL position 4 to either the DRIVE position 10 or REVERSE position 11, unless the solenoid 16 of the pawl mechanism is actuated by the controller 15.

Once the engine is running, if the operator wishes to move the shift lever 3 to the DRIVE position 10 or REVERSE position 11, the pawl control button 12 is depressed. If the transmission 6 is in the NEUTRAL state, the controller 15 may be programmed to permit movement of the shift lever 3 into the DRIVE position 10 or REVERSE position 11 even if the brake pedal 32 is not depressed. However, if the transmission is in the PARK state, the brake pedal 32 and pawl control button 12 must both be actuated to disengage the pawl 17 to permit movement of lever 3.

The vehicle may include one or more sensors 33 that detect the vehicle speed or other vehicle operating parameters. Controller 15 may be configured to prevent actuation of solenoid 16 under certain conditions. For example, if the shift lever 3 is in the DRIVE position 10, and the vehicle is moving at or greater than a predefined speed such as 10 mph, controller 15 may be configured to prevent actuation of solenoid 16 despite actuation of button 12 by an operator. The controller 15 could similarly be configured to prevent actuation of the solenoid 16 if the shift lever 3 is in the REVERSE position 11, and the vehicle is traveling at above a predetermined velocity and the operator depresses the button 12. Also, controller 15 may be configured to prevent a signal to the transmission 6 to move from the NEUTRAL to the PARK configuration if the transmission 6 is in the NEUTRAL position, the vehicle is traveling at above a predefined speed, and the vehicle operator depresses the toggle button 7. In this way, the controller 15 prevents putting the transmission 6 in the PARK state if the vehicle is traveling at above a predefined speed. Also, if the controller 15 is configured to permit actuation of solenoid 16 when in the DRIVE position 10 or REVERSE position 11 and the vehicle is traveling at above a preselected speed, such that the shift lever 3 can then be moved to the PARK/NEUTRAL position 4, and the operator depresses the toggle button 7, the controller 15 would disallow the shift, and the indicator 8 would continue to provide a readout indicating that the transmission 6 was in the NEUTRAL position.

Still further, controller 15 may be configured to permit actuation of solenoid 16 regardless of the vehicle speed, thereby permitting movement of shift lever 3. However, in this case the controller 15 may be configured such that controller 15 does not send a signal to transmission 6 despite movement of shift lever 3 and/or depression of button 7 under certain operating conditions. For example, if the vehicle is traveling forward at or above a predefined velocity, controller 15 may be configured to provide a shift of the transmission 6 from DRIVE to NEUTRAL or from NEUTRAL to DRIVE, but not to provide a signal shifting the transmission 6 from NEUTRAL to PARK or from NEUTRAL to REVERSE. Similarly, controller 15 may be configured to prevent shifting if the vehicle is traveling in a REVERSE direction. For example, if the vehicle is traveling in REVERSE at above a predefined speed, controller 15 would not shift the transmission 6 from the NEUTRAL to PARK configurations or from the NEUTRAL to DRIVE configurations, but may be configured to permit shifting from the REVERSE configuration to the NEUTRAL configuration and vice versa.

If a mechanical cable 28 is utilized to interconnect the shifter 1 to the transmission 6, the controller 15 may be configured to control the solenoid 16 based upon the inputs of the buttons 7 and 8, brake pedal 32, ignition 31 and sensors 33. In this configuration, controller 15 may be programmed such that it does not actuate solenoid 16 under certain vehicle operating conditions to prevent shifting of the transmission 6 into PARK if the vehicle is traveling in either forward or reverse directions above a preselected speed to prevent damage to the transmission 6. Similarly, controller 15 may be configured to prevent actuation of solenoid 16 if the vehicle is traveling in REVERSE at or above a preselected speed, and the shift lever 3 is in the PARK/NEUTRAL position 4 (and/or if it is in the REVERSE position 11), and the operator presses the button 12 in an attempt to shift into the DRIVE position 10. Similarly, controller 15 may be configured to prevent actuation of solenoid 16 if the vehicle is traveling in the forward direction at or above a predetermined speed and shift lever 3 is in the PARK/NEUTRAL position 4 (and/or if the shift lever 3 is in the DRIVE position 10).

Figure 4:
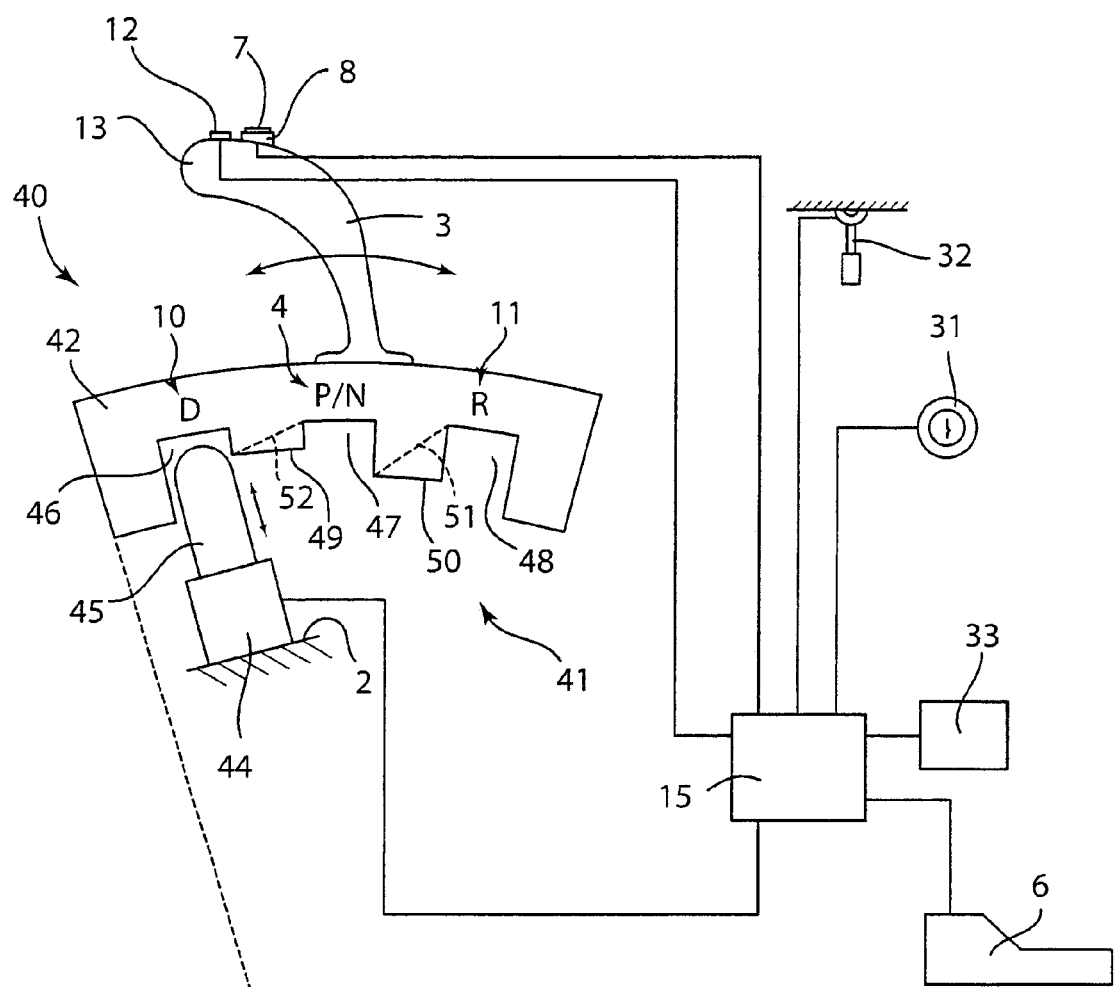
FIG. 4 is a partially schematic view of a shifter according to another aspect of the present invention.

With further reference to FIG. 4, a shifter 40 according to another aspect of the present invention includes a shift lever 3, toggle button 7, readout 8, and a pawl control button 12 that are substantially similar to the shifter 1 described in detail above. The shifter 40 also includes a controller 15 operably coupled to an ignition 31, brake pedal 32, sensors 33, and transmission 6. The shifter 40 includes a shift gate 41 formed on a movable member 42 that moves with the shift lever 3. The shift lever 3 and movable member 42 are pivotably connected to the base 2 for rotation about axis 43. A powered actuator 44 such as a solenoid or electrically powered linear actuator shifts a pawl 45 into and out of engagement with notches 46, 47 and 48 in shift gate 41. Notch 46 corresponds to the DRIVE position 10, notch 47 corresponds to the PARK/NEUTRAL position 4, and notch 48 corresponds to the REVERSE position 11. The powered actuator 44 is a continuous duty solenoid or other powered actuator that can control the distance of travel of pawl 45.

The height and shape of the raised portions 49 and 50 between notches 46, 47 and 48 can be utilized in conjunction with control of the distance of travel of pawl 45 to control the allowable movement of shift lever 3 based upon vehicle operating parameters. For example, controller 15 may be configured to determine the velocity of the vehicle based upon input from the sensors 33. If the vehicle is traveling above a predetermined speed, controller 15 may only permit retraction of pawl 45 to an "intermediate" position that is retracted far enough to clear the raised portion 49 between notches 46 and 47, but not retracted far enough to permit movement between notches 47 and 48. Thus, if the vehicle is traveling at, for example, 30 mph and the operator depresses the pawl control button 12, the pawl 45 would retract to the intermediate position permitting movement of the shift lever 3 between the DRIVE position 10 and the PARK/NEUTRAL position 4. However, the driver could not move the shift lever 3 into the REVERSE position 11 due to the raised portion 50. However, if the vehicle is traveling forward at a speed that is below a predetermined velocity such as, for example, 2 mph and the operator pushes the pawl control button 12, the controller would retract the pawl 45 to a position that would permit movement between notches 47 and 48, such that the vehicle operator could shift from the PARK/NEUTRAL position 4 to the REVERSE position 11. Also, the raised portions 49 and 50 could have angled or sloped surfaces as shown by the dashed lines 51 and 52 to provide "one-way" movement between the gear positions. For example, sloped surface 52 would permit movement of the shift lever from the PARK/NEUTRAL gear position 4 to the DRIVE position 10 even if the powered actuator 44 is not actuated, but prevents movement from the DRIVE position 10 to the PARK/NEUTRAL position 4 if the pawl 45 is not retracted. Similarly, sloped surface 51 would permit movement of the shift lever from the REVERSE position 11 to the PARK/NEUTRAL position 4 even if the pawl 45 is not retracted. Also, controller 15 may be programmed as described above to prevent movement from one gear position to another based upon vehicle operating conditions (e.g., speed). Controller 15 may also be programmed to permit movement of shift lever 3, but may be programmed such that transmission 6 is not shifted despite movement of shift lever 3 based upon vehicle operating conditions, as also described above.

Figure 5:
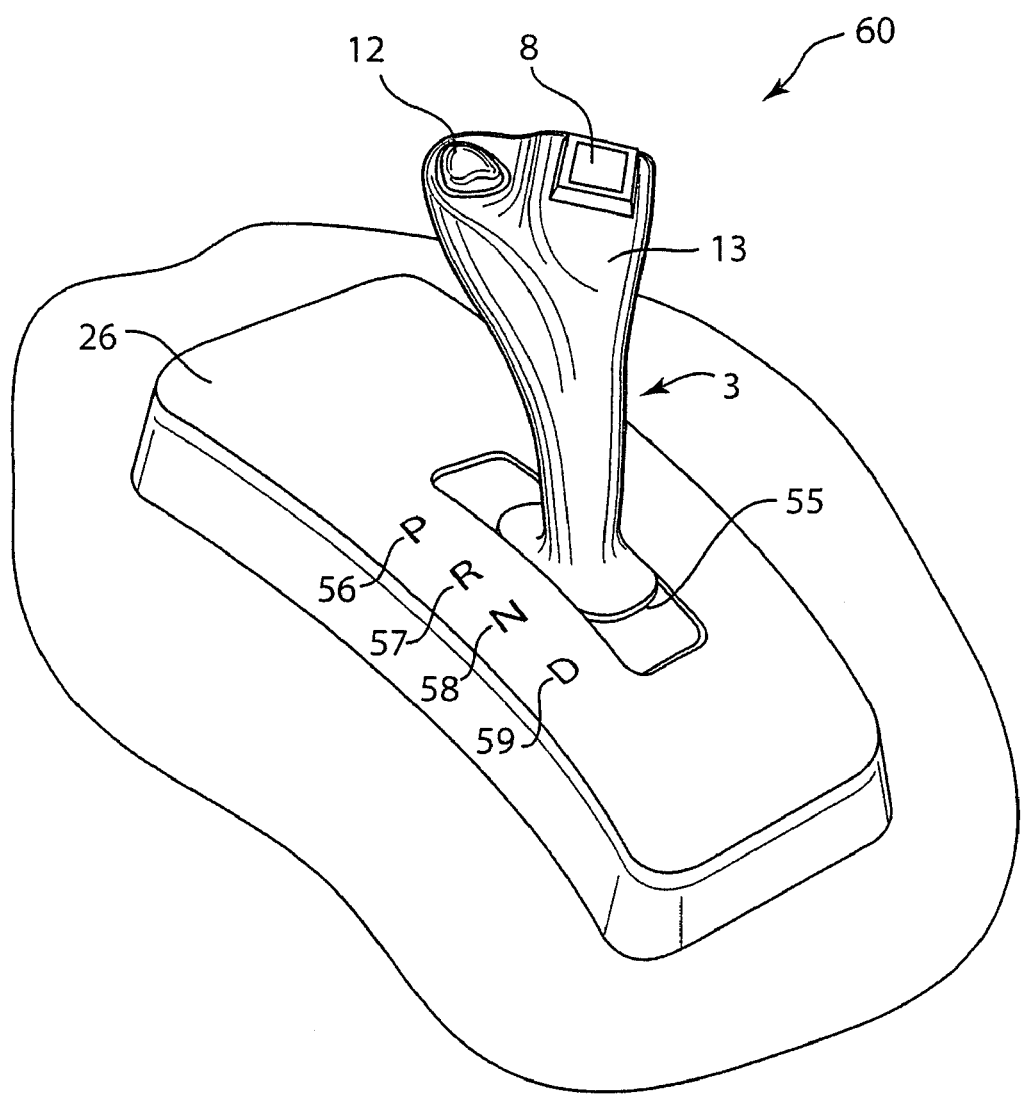
FIG. 5 is a perspective view of a shifter according to another aspect of the present invention.

With further reference to FIG. 5, a shifter 60 according to another aspect of the present invention includes a shift lane 55 having a PARK gear position 56, a REVERSE gear position 57, a NEUTRAL gear position 58, and a DRIVE gear position 59. The shifter 60 includes a display 8 indicating what the current state of the transmission is, but does not include a button 7 to toggle between the REVERSE and NEUTRAL positions. A pawl control button 12 operates in substantially the same manner as described in more detail above in connection with the shifter of FIGS. 1-4. The shifter 60 may have substantially the same construction as illustrated in FIGS. 2 and 3, except that an additional opening (not shown) in addition to the openings 18, 19 and 20 is provided for the additional gear position of the shifter of FIG. 5. Although the shift lane 55 is illustrated as including PARK gear position 56, REVERSE gear position 57, NEUTRAL gear position 58, and DRIVE gear position 59, it will be readily understood that the shift lane 55 of shifter 60 could also include additional gear positions such as 3, 2, 1 or the like designating lower gears. The shifter 60 of FIG. 5 could include a variety of shift gates and control arrangements as described in more detail in above-referenced U.S. Provisional Application Nos. 60/470,609 and 60/511,421.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A shifter for controlling a vehicle transmission, comprising:
   a base;
   a shift lever movably mounted to the base for movement between a plurality of gear positions, at least one of the gear positions comprising a PARK/NEUTRAL position having a PARK and a NEUTRAL control feature;
   an input device configured to switch between PARK and NEUTRAL upon actuation of the input device by an operator; and
   an indicator on the shift lever indicates if the transmission is in PARK or NEUTRAL.

2. The shifter of claim 1, wherein:
   the input device comprises a first input device; and including:
   a pawl that restricts movement of the shift lever;
   a second input device on the shift lever that controls the pawl.

3. The shifter of claim 2, wherein:
   the shift lever is movable to a DRIVE position and a REVERSE position; and including:
   a controller that prevents moving a transmission to the PARK position if the vehicle is moving at a speed that is above a predetermined velocity.

4. The shifter of claim 3, wherein:
   the indicator provides a warning signal if the first input device is actuated while the vehicle is moving at a speed above the predetermined velocity.

5. The shifter of claim 3, wherein:
the controller does not shift the transmission out of PARK unless the vehicle brake pedal is depressed.

6. The shifter of claim 2, wherein:
the second input device comprises a movable member, wherein the indicator is on the movable member.

7. The shifter of claim 6, wherein:
the first and second input devices comprise buttons.

8. The shifter of claim 7, including:
an electrically powered pawl; and wherein:
the buttons are electrically coupled to the electrically powered pawl.

9. The shifter of claim 8, wherein:
the DRIVE, PARK/NEUTRAL, and REVERSE gear positions are in a generally straight line.

10. The shifter of claim 1, including:
an ignition device including a fob member generating a wireless security signal and a receiver that receives the security signal when the fob member is in the vicinity and enables the vehicle ignition if the security signal has a predefined configuration.

11. The shifter of claim 10, wherein:
the shifter includes a powered pawl that is controlled, at least in part, based upon if the receiver has received a security signal having the predefined configuration.

12. The shifter of claim 1, including:
a shift gate;
a powered pawl configured to engage the shift gate to selectively restrict movement of the shift lever, wherein the distance of travel of the pawl is based at least in part on a vehicle operating parameter.

13. The shifter of claim 12, wherein:
the vehicle operating parameter comprises vehicle speed.

14. The shifter of claim 13, wherein:
the shift gate includes a DRIVE position, a PARK/NEUTRAL position, and a REVERSE position, and wherein the shift gate includes a first raised portion between the DRIVE gear position and the PARK/NEUTRAL gear position, and a second raised portion between the PARK/NEUTRAL gear position and the REVERSE gear position, wherein the powered pawl shifts at least a first distance to clear the first raised portion, and shifts at least a second distance to clear the second raised portion, and wherein the shifter is configured to prevent the pawl from shifting to at least the second distance if the vehicle speed is above a predetermined level to thereby prevent shifting to REVERSE.

15. A shifter for vehicle transmissions, comprising:
a base;
a shift member movably mounted to the base for movement between DRIVE, PARK/NEUTRAL, and REVERSE gear positions;
a pawl selectively restricting movement of the shift member between the gear positions;
a first input device on the shift member that can be manipulated by an operator to control actuation of the pawl; and
a second input device on the shift member to control shifting between PARK and NEUTRAL when the shift member is in the PARK/NEUTRAL gear position.

16. The shifter of claim 15, including:
an indicator on the shift member providing a signal showing what gear the transmission is in.

17. The shifter of claim 16, wherein:
the shift member comprises a shift lever.

18. The shifter of claim 17, wherein:
the indicator is on the second input device.

19. The shifter of claim 18, wherein:
the first input device is mechanically linked to the pawl for actuation of the pawl.

20. The shifter of claim 18, wherein:
the pawl is electrically powered, and the first and second input devices comprise buttons electrically coupled to the pawl.

21. A shifter for controlling the transmission of a vehicle, comprising:
a floor console having a base;
a shift lever movably mounted to the base, the shift lever being movable between a DRIVE gear position, a combined PARK/NEUTRAL gear position, and a REVERSE gear position, but the shift lever not being movable to a separate PARK gear position; and
an input device operably connected to the shift lever for shifting between a PARK gear position and a NEUTRAL gear position while the shift lever itself remains in the combined PARK/NEUTRAL gear position.

22. A shifter for controlling the transmission of a vehicle, comprising:
a floor console having a base;
a shift lever movably mounted to the base, the shift lever movable between DRIVE, PARK/NEUTRAL, and REVERSE gear positions; and wherein:
the shift lever has a knob with an indicator on the knob providing an indication of the gear position of the transmission; and
an input device on the knob that shifts between the PARK and NEUTRAL positions when the shift lever is in the PARK/NEUTRAL gear position.

23. The shifter of claim 22, wherein:
the input device comprises a first input device; and including:
a pawl configured to control movement of the shift lever;
a second input device on the knob that is operably coupled to the pawl for controlling the pawl.

24. The shifter of claim 23, wherein:
the pawl is electrically powered, and the first and second input devices comprise buttons.

25. A shifter for controlling a transmission, comprising:
a base;
a shift member movably mounted to the base, the shift member being movable to a plurality of gear positions for control of a transmission and including a pawl for controlling movement between the gear positions;
an indicator on the shift member having a visual display indicating what gear the transmission is in; and
a pawl control button on the shift member for controlling movement of the pawl;
the shift member including a grip with an enlarged top end surface having the pawl control button therein and the indicator therein adjacent the pawl control button, with position of the pawl control button and the indicator allowing the pawl control button and the indicator to both be seen simultaneously from a position generally over the shift member.

26. The shifter of claim 25, wherein:
the shift member comprises a lever movable along a shift lane having a plurality of gear positions.

27. A shifter for controlling a transmission wherein:
a base;
a shift member movably mounted to the base, the shift member being movable to a plurality of gear positions for control of a transmission;

an indicator on the shift member having a visual display indicating what gear the transmission is in;

the shift member comprises a lever movable along a shift lane having a plurality of gear positions;

at least one of the gear positions comprises a PARK/NEUTRAL position; and including:

an input device configured to switch between PARK and NEUTRAL upon actuation of the input device by an operator.

28. The shifter of claim 27, wherein:

the input device comprises a first input device; and including:

a pawl that restricts movement of the shift lever;

a second input device on the shift lever that controls the pawl.

29. The shifter of claim 28, wherein:

the second input device comprises a movable member, wherein the indicator is on the movable member.

30. The shifter of claim 29, wherein:

the first and second input devices comprise buttons.

31. The shifter of claim 30, including:

an electrically powered pawl; and wherein:

the buttons are electrically coupled to the electrically powered pawl.

32. The shifter of claim 26, wherein:

the shift lane includes PARK, REVERSE, NEUTRAL, and DRIVE gear positions.

33. The shifter of claim 32, wherein:

the indicator comprises a lighted display.

* * * * *